United States Patent
Li et al.

(10) Patent No.: US 9,223,950 B2
(45) Date of Patent: Dec. 29, 2015

(54) SECURITY CHALLENGE ASSISTED PASSWORD PROXY

(71) Applicant: Intel Corporation, Santa Clara, CA (US)

(72) Inventors: Hong Li, El Dorado Hills, CA (US); Rita H Wouhaybi, Portland, OR (US); Tobias Kohlenberg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/785,094

(22) Filed: Mar. 5, 2013

(65) Prior Publication Data

US 2014/0259130 A1   Sep. 11, 2014

(51) Int. Cl.
*G06F 21/31*   (2013.01)

(52) U.S. Cl.
CPC .............. *G06F 21/31* (2013.01); *G06F 21/316* (2013.01); *G06F 2221/2103* (2013.01)

(58) Field of Classification Search
CPC ....... G06F 21/31; G06F 21/44; G06F 21/316; G06F 2221/2103; H04L 63/10
USPC ...................... 726/2–7, 26–30; 713/182, 185; 707/783, 784; 705/14.25
See application file for complete search history.

(56) References Cited

U.S. PATENT DOCUMENTS

| | | | |
|---|---|---|---|
| 8,161,534 B2 | 4/2012 | Golle et al. | |
| 8,584,219 B1 * | 11/2013 | Toole et al. | 726/7 |
| 2004/0073629 A1 | 4/2004 | Bazot et al. | |
| 2004/0117493 A1 | 6/2004 | Bazot et al. | |
| 2005/0097320 A1 * | 5/2005 | Golan et al. | 713/166 |
| 2006/0026286 A1 | 2/2006 | Lei et al. | |
| 2008/0077809 A1 * | 3/2008 | Hayler et al. | 713/193 |
| 2008/0134305 A1 * | 6/2008 | Hinton et al. | 726/5 |
| 2009/0119756 A1 * | 5/2009 | Acuna et al. | 726/5 |
| 2010/0037046 A1 * | 2/2010 | Ferg et al. | 713/155 |

(Continued)

FOREIGN PATENT DOCUMENTS

WO   WO-2014137744 A1   9/2014

OTHER PUBLICATIONS

Jim Basney et al, The MyProxy online credential repository, pp. 801-816, John Wiley & Sons, Ltd. 2005.*
Jim Basney, Credential Wallets, www.ietf.org, 2001.*
"International Application Serial No. PCT/US2014/019023, International Search Report mailed Jun. 16, 2014", 3 pgs.

(Continued)

*Primary Examiner* — Shanto M Abedin
(74) *Attorney, Agent, or Firm* — Schwegman Lundberg & Woessner, P.A.

(57) ABSTRACT

Systems, apparatus, and methods of authentication utilizing contextual data to authenticate individuals and prevent security breaches are described herein. An example proxy engine may monitor interactions with a computing device to obtain contextual data unique to a user. The contextual data may be utilized to generate unique challenge questions in response to requests for access to a secure resource, and may eliminate the need for a user to remember credentials to access the resource. Challenge questions may be limited to a single use and vary in difficulty in proportion to the value of the resource. In response to correct responses to challenge question(s), the proxy engine may access a vault containing a credential authorizing access to the resource. The vault and proxy engine may be entirely contained on the computing device or they may be implemented on a remote apparatus accessed via an application or interface on the computing device.

22 Claims, 5 Drawing Sheets

(56) References Cited

U.S. PATENT DOCUMENTS

| | | | |
|---|---|---|---|
| 2010/0229223 A1* | 9/2010 | Shepard et al. | 726/5 |
| 2010/0281059 A1* | 11/2010 | Lynch | 707/784 |
| 2012/0137213 A1 | 5/2012 | Hayler et al. | |
| 2013/0042327 A1* | 2/2013 | Chow | 726/28 |
| 2013/0198822 A1* | 8/2013 | Hitchcock et al. | 726/6 |

OTHER PUBLICATIONS

"International Application Serial No. PCT/US2014/019023, Written Opinion mailed Jun. 16, 2014", 7 pgs.

Nosseir, Ann, et al., "Question-Based Authentication Using Context Data", (Oct. 2006), 430-431.

\* cited by examiner

SECURITY CHALLENGE ASSISTED PASSWORD PROXY

BACKGROUND

Due to the proliferation of electronically available services, many of which involve financial or personal information, the number of username and password combinations for individual users are increasing daily. Moreover many online sites now require users to create accounts and provide log-in credentials in order to access less sensitive information, such as daily news, sale information, or a horoscope. As a result, users tend to resort to choosing the same username and password for multiple accounts. This approach lowers the security and strength of a username/password combination because breaking one account on a service could lead to unauthorized access to other accounts. There is a high cost of having online accounts broken into, yet it is difficult and inconvenient for some users to create and efficiently maintain different usernames and passwords for multiple accounts.

Additionally, the theft of users' online authentication information, such as usernames, password, answers to security challenge questions or other identifying information, by a Trojan horse virus or application is a common security problem. One of the most common mechanisms for a Trojan virus to steal a user's authentication information is through the use of keystroke logging. Common counter measures for anti-key logging techniques include applications to prevent password stealing through the use of one-time passwords (OTP), on-screen keyboards, keystroke interference, as well as other non-technological methods to confuse the Trojan key logger. These techniques provide different levels of protection. However, they generally rely on at least one pre-established shared secret between the user and the website, or actions that may result in an undesirable user experience. These techniques also fail to counteract the Trojan viruses designed to capture password by ways other than keystroke logging, such as by intercepting a password transmitted to a website.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF THE EMBODIMENTS

Figure 1:
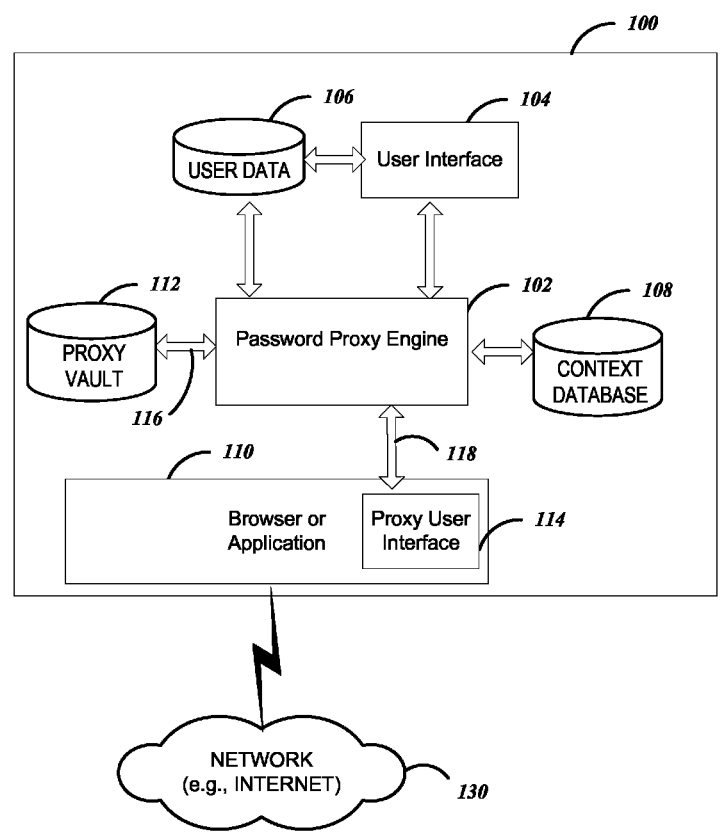
FIG. 1 is a block diagram illustrating an example of a device with a password proxy engine, according to an embodiment.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Protecting a user's identity and personal data creates a need for strong authentication. Two-factor authentication using a one-time password (OTP) combines something the user knows (e.g., a credential such as a username-password combination), and something the user has, for example, a token or key fob that produces a multi-digit number that is valid only for a short period of time. Alternatively, an OTP may be generated between the user device and the authenticator using non-token based techniques such as time synchronization or a pre-established secret. A combination of username, password, and an OTP may provide a more secure authentication mechanism than a username and password alone. However, a token based OTP requires the user to physically have the token, which may be lost, stolen or compromised.

The use of one or more single-use, time sensitive, user-specific security challenge questions may eliminate the need for an OTP token, and make it impossible for Trojan-based credential-stealing hackers to exploit or profit from the theft. Thereby an advantage of the present disclosure over alternative security or authentication systems is that embodiments of the present disclosure are able to protect a user's identity and data, even in a scenario where some information may be stolen.

Examples include methods and systems to maintain usernames and passwords for an individual that are unlocked with an individual's personal contextual information. Protection from user password being stolen by a Trojan virus may be provided through the use of a password proxy service utilizing one or more single-use security challenge questions and responses. The single-use time sensitive questions may be generated with specific user context that, in most instances, only questions the user is able to answer. This technique mitigates the risks present in the use of shared static secret passwords that may be stolen by a Trojan virus or key-logger during transmission or from client storage.

Additionally, example embodiments may improve a user's experience during interactions with secure resources by reducing or eliminating the need to remember multiple username-password combinations or other credentials. A user may easily respond to security challenge questions because the questions are generated based on the user's knowledge and current or recent context. In contrast with requiring users to remember answers to random or insecure questions they encountered during the setup of an account (e.g., a favorite pet or color, or a maiden name), authentication questions may be more closely related to the current context of a user's life. This provides an advantage over user's providing false information in response to challenge questions out of privacy concerns that are easily forgotten. Generally, an individual other than the user does not possess the user's knowledge or context and is unable to correctly answer the authentication questions. The difficulty of the questions may vary in direct proportion to the value of the secure resource being requested.

FIG. 1 is a block diagram illustrating an example of a device 100 with a password proxy engine 102, according to an embodiment. The password proxy engine 102 is configured to receive user context data via a user interface 104 or by accessing a user data 106 that may be stored in a database or record. The password proxy engine 102 may store accumulated user context data in a context database 108. User context data may include, for example, a geographic location obtained from a GPS module, calendar data, contact information, information from user activity sensors, or any other data that may be unique to the device 100 or a user's interaction with the device 100. The user context data may be utilized by the password proxy engine 102 to generate one-time, in situ security challenge questions and to verify user responses.

The password proxy engine 102 may receive data from sensors (not shown) to create context observations as needed. For example, a meeting scheduled in a calendar application may indicate a time, location, and names of one or more individuals that the owner of the device 100 is meeting with in the future, is meeting with at the present time, or has met with in the past. GPS location data may be utilized to confirm that the device 100 is or was actually located at the location indicated in the meeting. Received audio data, for example acquired by monitoring a microphone of the device 100, may also be used to determine if music was playing, and if so, what type of music of specific songs or artists. For example, the user context data may be generated and stored that indicates the device 100 was present at a coffee shop on a specific street, in a specific city, where a meeting with an individual named Paul was scheduled under the heading "lunch." The user context data may be generated and processed by the password proxy engine 102 entirely on the device 100, or the password proxy engine 102 may communicate with one or more services over network 130 (e.g., the Internet or an intranet) to analyze or store the user context data in the context database 108. Other sources of context data may include, but are not limited to, a user's phone log, SMS history, or e-mail exchanges.

The password proxy engine 102 may interact with a browser or application 110 or another application configured to operate on the device 100. The device 100 may configured to access a network 130 through a wired or wireless interface. The password proxy engine 102 may be configured to receive one or more user credentials via the user interface 104. The one or more user credentials may include username-password combinations associated with one or more secure resources. For example, a user may provide, via user interface 104 or by reference to user data 106, a uniform resource locator (URL) and username-password credential for an on-line banking portal. The user may have previously established a financial account with the bank, or may initiate a new relationship with the bank via the device 100 and the banking portal.

Additionally, the user may provide a URL and username-password credential for less valuable websites, such as a website that provides daily coupon deals or provides access to a gaming or social network. The user may assign different security levels to the credentials and resources (e.g., the banking website may be categorized as a high-value resource, the coupon deal website may be categorized as a low-value resource, and social network may be categorized as an average value resource between the low and high values categories). Other rankings or categorization methods, such as applying a numerical ranking to individual resources, may also be utilized. The security level may be utilized by the password proxy engine 102 to determine the number or difficulty level of context challenges that must be met before access is granted to a specific resource, as well as a length of time a specific contextual challenge is valid for or how often a new challenge must be performed.

In an example, a secure resource may indicate the value of an account to device 100. For example, a user's credentials to the daily coupon deal account are not as valuable as the credentials to their bank, or retirement account. Therefore, one easy challenge question to the daily coupon deal account might be enough, while the bank may indicate that access to an account may be granted only after a succession in which four challenging questions are answered correctly. As a result, four inputs to access the bank account may provide greater security than requiring that a user type a full username and password, while also requiring less effort on the part of the user. The policies and requirements for access to accounts may change over time, for example, the user may provide credit card information to the daily coupon deal account, which may result in raising the security level of the account from a first priority with a low security ranking to a second priority level with a higher security ranking than the first priority. As a result of the increase in security ranking, the user may be asked to answer additional medium-difficulty questions before access is granted.

The device 100 may include a proxy user interface 114 configured to interact with the browser or application 110 such that a request made by a user to access a secure resource via the browser or application 110 may be intercepted. The request may be routed to the password proxy engine 102 for authentication by a user of the device 100 before access to the secure resource is allowed. In an example, the password proxy engine 102 may provide a security credential (e.g., username and password) to the secure resource upon the successful receipt of correct answers to the authentication challenge from the user.

In an example, each authentication challenge (e.g., each piece of user context data) may be used only once, and then deleted or archived. During an initial learning or setup process with the device 100, the password proxy engine 102 may not be able to obtain any or enough user context data from the context database 108 to generate an authentication challenge. If there isn't enough context data, the password proxy engine 102 may request that a user answer an initial set of questions in order to generate an initial set of context data that may be used to generate further questions or for initial access to secure resources.

Because individual users each have a different cognitive level and memory status, which could also change over time, the password proxy engine 102 may initially or periodically generate an set of questions based on public data about the user (e.g., data published on a social network) and query the user while recording the user's response time, correctness of responses, and any other input that may be available from device 100. This public information may be excluded from use as actual context information for generating authentication questions due to its public nature. The recorded data may be analyzed in order to identify what types of questions are of an easy, average, or challenging difficulty. For example, a learning protocol may be utilized in password proxy engine 102 that may determine what is easy and what is not to a particular individual.

In an example, the password proxy engine 102 may be configured to access and maintain a proxy vault 112. The proxy vault 112 may be a secure database on the device 100, (e.g., in non-volatile memory) configured to store shared secrets or credentials (e.g., username and password combinations) in an encrypted format. The proxy vault 112 may be accessed by the password proxy engine 102 to retrieve a specific credential for a secure resource after a user has requested access to the secure resource and correctly responded to one or more challenge questions.

The proxy vault 112 may be populated with user supplied credentials during an initial setup or updated whenever the user accesses a new secured resource for the first time. The device 100 may be configured to only allow the proxy vault 112 to be updated when the device is in a secure mode, for example, in a configuration where all data access to the network 130 is blocked such that a malicious key logger application may be prevented from intercepting and transmitting the credential associated with the new secure resource. The password proxy engine 102 and the proxy vault 112 may be configured to communicate over an encrypted link 116 to prevent interception of unencrypted (e.g., plain text) credentials.

As discussed above, the device 100 may include a proxy user interface 114. For example, the proxy user interface 114 may include a browser plug-in, compatible with the browser or application 110, which is configured to receive user input and provide user notifications in the browser or application 110. The password proxy engine 102 and the proxy user interface 114 may be configured to communicate over an encrypted link 118 to prevent interception of user inputs.

Figure 2:
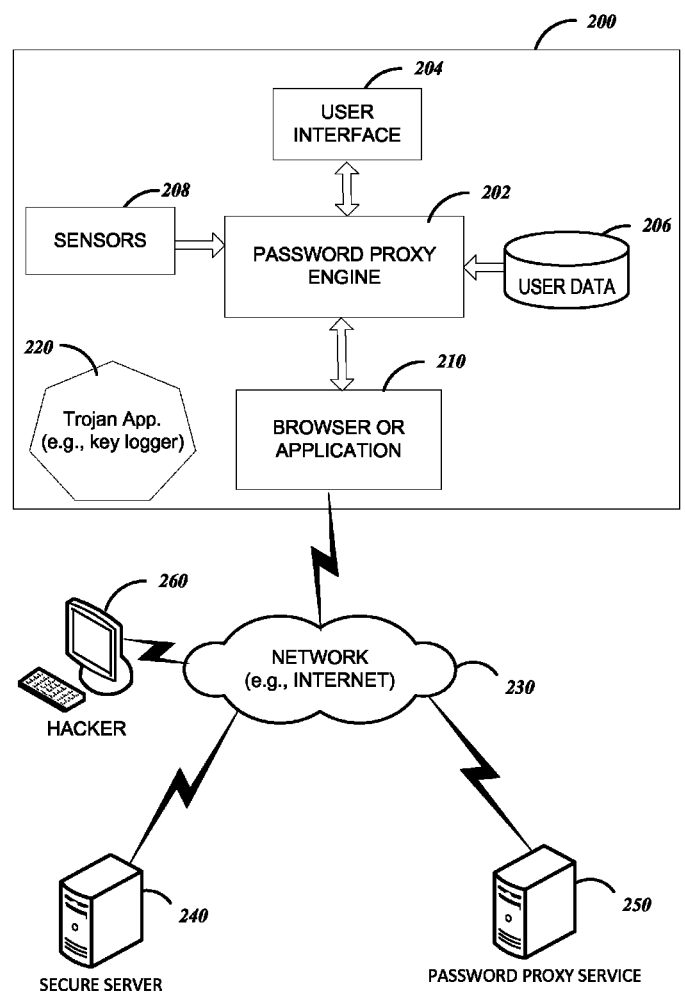
FIG. 2 is a block diagram illustrating an example of a device configured to communicate over a network, according to an embodiment.

FIG. 2 is a block diagram illustrating an example of a device 200 configured to communicate over a network 230, according to an embodiment. The device 200 may include a password proxy engine 202 configured to coordinate access to a secure server 240 by interacting with a user through a user interface 204. The interactions may include challenge questions based on user data 206 stored on the device 200 from contextual information obtained from sensors 208 of the device 200. The secure sever 240 may provide a valuable service such as hosting a website or portal (e.g., www.FirstAcmeBank.com), which requires the use of a credential to access.

The password proxy engine 202 may communicate with a password proxy service 250 over the network 230. The password proxy service 250 may store, maintain and provide the user-id and password information on behalf of the user. The password proxy service 250 may provide the user's user-id and password information to the secure server 240 or the password proxy engine 202 upon notification of a successful challenge-and-response authentication by the password proxy engine 202.

The password proxy service 250 may provide users with separate, secure password vaults that are independent of the device 200. A user may access his or her password vault on the password proxy service 250 through interactions with the password proxy engine 202, or through an alternative secure terminal or device coupled to the password proxy service 250 via network 230. The device 200 may access the password proxy service 250 via a separate encrypted authentication channel, thereby making it more resilient to Trojan attacks on the device 200.

In an example, the password proxy engine 202 may be configured to communicate with the password proxy service 250 in order to receive one-time challenge questions based on specific in situ user context collected from other applications (e.g., browser or application 210) or sensors 208 on the device 200, verify the user input responses to the questions, and send notifications to the password proxy service 250 and the user. For example, utilizing the contextual input, "Met with Paul for lunch on Saturday, music was playing in the background," from the user data 206, one or more questions may be generated from this context by omitting one or more of the facts, such as "Who did you meet for lunch on Saturday?" or "Was music playing when you recently met with Paul?" The number of facts omitted from the challenge question may depend on how difficult the question should be with respect to the value of the secure resource being requested. Also, creating a multiple-answer question could provide different difficulty levels out of one context in order to satisfy the need for authentication.

In an example, the device 200 may be infected with a virus or other malware, such as a key logging Trojan application 220. The use of the device 200 with an active Trojan application 220 may be subject to monitoring by a hacker 260. For example, if the Trojan application 220 is able to intercept keystrokes on the user interface 204 and transmit the stolen data over the network 230, the hacker 260 may attempt to access a user's secure data on a secure server 240. While the Trojan application 220 may be able to intercept a user's request to access the secure server 240, as well as any challenge question responses entered via user interface 204, the hacker 260 is prevented from obtaining keystrokes that include the user's credentials for accessing the secure server 240 because any keystrokes captured by the Trojan do not include credential information.

The need for the user to enter secure credentials is eliminated by the use of the password proxy engine 202 instructions to the password proxy service 250 to provide the user's credentials to the secure server 240 in response to one or more correctly answered contextual challenge questions. Even if the hacker 260 is able to intercept the answers to the contextual challenge questions the answers would not be useful in accessing the secure server 240 as the secure server 240 may not be using the challenging questions to verify the user. In cases where the hacker attempts to authenticate via the password proxy engine 202 on the device 200 (e.g., via malware), or the security challenge questions are generated by a proxy service 250, the hacker's attempt will fail as well because the questions are not reused by the password proxy engine 202 or the password proxy service 250. Any attempt by the hacker 260 to utilize the answers to the contextual challenge questions to interact with the password proxy service 250 will likewise fail as the password proxy service 250 may be configured to refuse the reuse of any contextual challenge question.

In an example, the secure server 240 is not configured to present a challenge or receive a response. Instead, the password proxy service 250 handles such challenge-response activities and only passes an affirmative indication to the secure server 240 when the user correctly responds. Thus, in such a configuration, even if the hacker 260 were able to intercept answers to contextual challenge questions, such answers would be useless when attempting to directly access the secure server 240 because the secure server 240 does not participate in the challenge-response mechanism.

Figure 3:
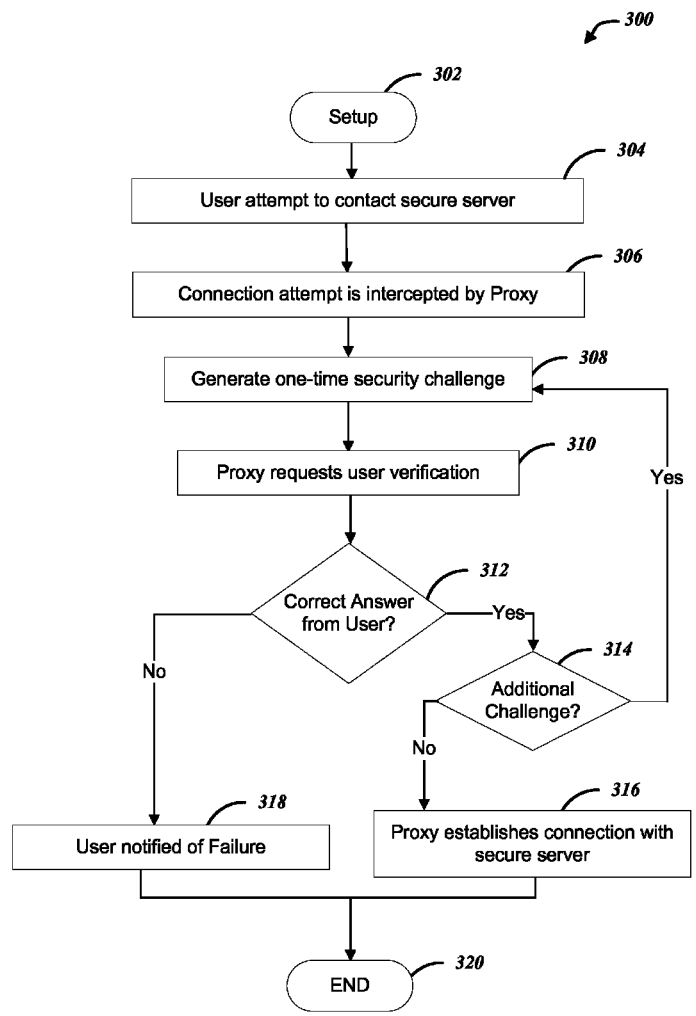
FIG. 3 is a flow diagram illustrating an example scheme for providing security challenges, according to an embodiment.

FIG. 3 is a flow diagram illustrating an example scheme 300 for providing security challenges, according to an embodiment. The scheme 300 may be implemented, for example, on the device 100 of FIG. 1 or the device 200 of FIG. 2. At 302, an initial setup on a device may be performed. The initial setup may include receiving one or more user credentials for storage in an encrypted proxy vault. The proxy vault may be local to the device, such as in the device 100, or maintained on a remote server, such as the password proxy service 250 of FIG. 2. The initial setup may also include configuring or training a proxy engine to provide an appropriate difficulty level of contextual challenge questions based on the sophistication of an individual user and the value of any credentials stored in the proxy vault. For example, the cognitive level and memory capability of a user, as determined based on the user's response time, correctness of responses, or other factors, may indicate that a greater number of simple questions may be required to establish an equivalent level of security for a user who is slow to respond with correct answers in comparison to a user who is able to rapidly respond to difficult questions.

At 304, a user may attempt to contact a secure server with a device equipped with a proxy engine. At 306, the attempt may be intercepted by the proxy engine on the device. The interception may be performed by a module or plug-in that may be installed on the device (e.g., as part of the device's operating system) or in a web browser or other application on the device.

At 308, the proxy engine may generate a one-time security challenge, such as a contextual question based on the user's recent activities or interactions with the user's device. The contextual question may be in the form of a multiple choice, a true-false question, a question requiring a text-based answer, or other question formats. The proxy engine may generate the contextual question on the device, or access a proxy service for user context data.

At 310, the proxy engine may request that the user provide verification of their identity by answering the contextual question. The contextual question may be presented on a display in any form, such as a multiple-choice format, a true or false style question or a fill-in-a-blank query, or through a spoken question that may be answered with a voice command. At 312, the user's answer to the contextual question is evaluated for correctness. The evaluation may be performed on the device by a password proxy engine, or by a remote proxy service.

At 314, if the evaluation indicates that the user's answer is correct, the proxy engine may determine if an additional challenge is needed in order to provide a desired level of security for the requested secure resource. If an additional challenge is needed then scheme 300 may, at 308, generate a challenge question. If no additional challenge questions are needed, then at 316, the proxy engine may establish a connection with the secure server, for example, by providing a user credential from the proxy vault to the secure server over an encrypted communication channel.

At 318, if the evaluation indicates that the user's answer is not correct, the user may be notified of any failure to correctly answer a challenge question. The scheme 300 may terminate at 320 upon the failure of the user to correctly answer a challenge question. In an example, the user may be given a fixed number of tries to answer different challenge questions before further attempts are prohibited. If further attempts are prohibited, e.g., locking the device, the device may be unlocked by providing a previously established recovery password. An advantage of utilizing scheme 300 on a user device is that attack scenarios of password stealing may mitigates the following risks/attacks:

Key logging Trojan may attempt to use software or hardware to record key strokes, thereby capturing user inputs, which may be transmitted to a hacker or other malicious actor. The hacker may then uses the captured credentials to access a secure resource such as a banking website.

Key logging Trojans may be defeated because: (1) the user does not need to key in a user-id/password combination because the credential is handled by a proxy service, and (2) the Trojan may steal the answers to challenge questions and send them to the hacker, but the information will be useless for the hacker because the questions were created based on user context at a point in time, for only a single use. Therefore these answers are not be applicable to future challenge questions, and are not utilized to access secured resources.

Man-in-the-middle (MITM) attacks against traditional OTP or automatic log-ins that steal information typically utilize common password logging methods to enable a hacker to obtain user credentials for future use. In a scenario where a stealth virus automatically logs into the targeted website upon receiving the stolen credentials without significantly time delay, the typical OTP approach would not prevent theft. The use of a proxy may be more effective against MITM attacks with the combination of user-id/password and challenge/response from different entities (e.g., a client device and a password proxy service).

A hacker may be able to obtain the user credentials from channels other than Trojan key loggers; however, with the addition of a password proxy service, a hacker cannot access a secure target website directly without the ability to respond to the security challenge questions via a separate authentication channel as described herein. Similarly, attempts to use brute force attacks utilizing stolen security challenge questions/responses may be rendered useless due to the dynamic nature of the challenge questions, which may be generated on the device or by the password proxy service.

Figure 4:
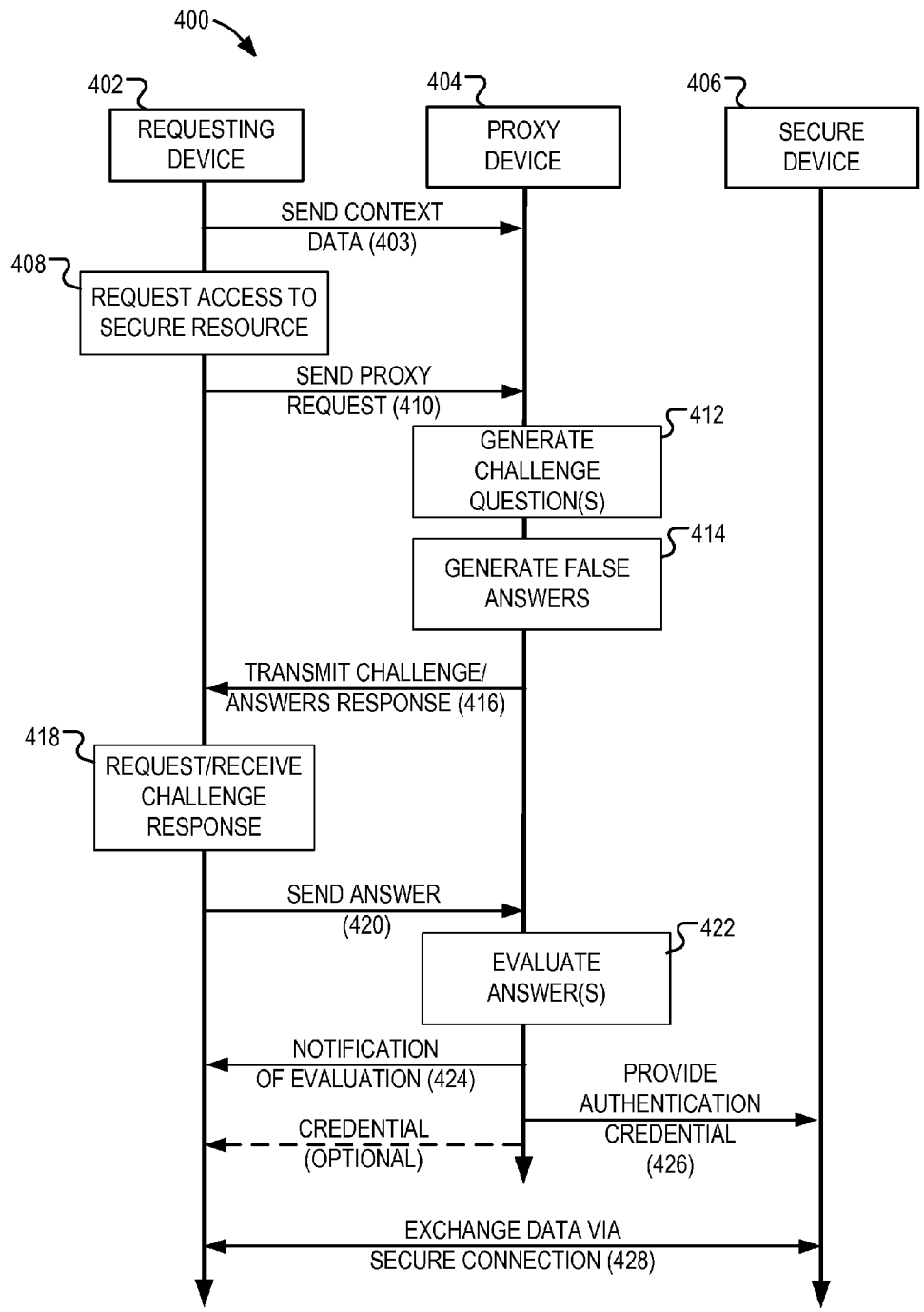
FIG. 4 is a swim lane diagram illustrating example interactions between a requesting device, a proxy device, and a secure device, according to an embodiment.

FIG. 4 is a swim lane diagram illustrating example interactions between a requesting device 402, a proxy device 404, and a secure device 406, according to an embodiment. The device-device interaction 400 may include or support any of a variety of typical security protocols, including, but not limited to, transport layer security (TLS), or secure sockets layer (SSL). For additional information, the Internet Engineering Task Force (IETF) has prepared version 1.2 of the TLS protocol in RFC 5246 (request for comments 5246). The device-device interaction 400 may include or support any of a variety of application layer protocols, including, but not limited to, Hypertext Transfer Protocol (HTTP), File Transfer Protocol (FTP), Simple Mail Transfer Protocol (SMTP), and Extensible Messaging and Presence Protocol (XMPP).

A requesting device 402 may send context data 403 to a proxy device 404 on an intermittent or periodic basis. The proxy device 404 may include a server or computing resource coupled to the requesting device 402 by a network. The context data 403 may be derived from a user's interactions with the requesting device 402, from data stored or accessed by one or more applications on the requesting device 402, or from other external sources (e.g., a social network, or other public data sources).

The requesting device 402 may receiving an instruction (e.g., from a user) to access a secure device 406 (e.g., a banking system), such as from a user. In response to the instruction to access the secure device 406, the requesting device transmits a request 410. In the example device-device interaction 400 illustrated in FIG. 4, in response to a user input requesting access to a secure resource at 408, the requesting device 402 may send a proxy request 410 to the proxy device 404. In an alternative example, the request 410 may be intercepted by a proxy engine on requesting device 402.

The proxy device 404 may, at 412, generate one or more challenge questions in response to the request 410, as well as a correct response to the one or more challenge questions. The proxy device 404 may also generate one or more false answers (block 414) in addition to the challenge questions generated. The challenge questions and false answers may both be based on context data 403 supplied to the proxy device 404 by the requesting device 402. At 416, the proxy device 404 may transmit the challenge questions, and correct and incorrect answers, to the requesting device 402, thereby responding to request 410.

At 418, upon receipt of the challenge questions and answers from the proxy device 404, the requesting device 402 may prompt a user with one or more of the challenge questions and receive a response from the user. At 420, the user's response to the challenge question(s) may be sent to the proxy device 404 for evaluation. The requesting device 402 need not be provided with an indication of which potential answer to the challenge question is correct.

At 422, the proxy device 404 may evaluate the user's answer or multiple answers if multiple questions were presented. At 424, a notification of success or failure of the evaluation is transmitted to the requesting device 402. If the evaluation is successful (e.g., all answers were correctly provided) the proxy device may provide an authentication credential 426 to a secure device 406. Optionally, the proxy device 404 may also provide the credential to the requesting device 402. Consequently, at 428, the authentication credential, provided at 426, allows the requesting device 402 and the secure device 406 to exchange data via a secure connection. The secure connection may be established after the credential is passed from the proxy device 404 to the requesting device 402 and the secure device 406, thereby providing both the requesting device 402 and the secure device 406 with a common secret key or other encryption code that may facilitate secure communications.

Figure 5:
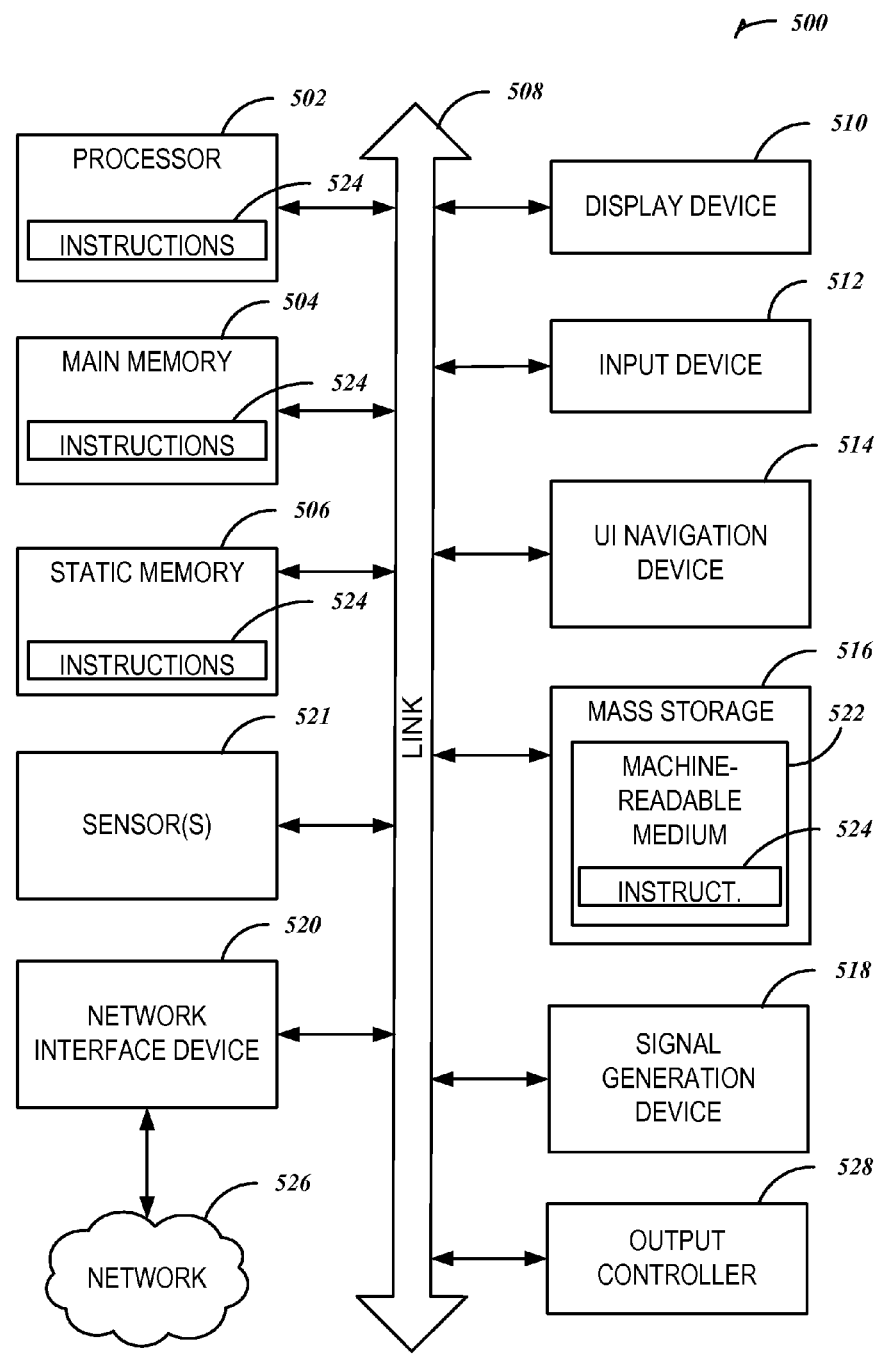
FIG. 5 is a block diagram illustrating an example machine upon which any one or more of the techniques discussed herein may be performed.

FIG. 5 is a block diagram illustrating an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a processing unit, a graphics processing unit (GPU), a hardware processor core, or any combination thereof), a main memory 504, and a static memory 506, some or all of which may communicate with each other via a link 508 (e.g., a bus, link, interconnect, or the like). The machine 500 may further include a display device 510, an input device 512 (e.g., a keyboard), and a user interface (UI) navigation device 514 (e.g., a mouse). In an example, the display device 510, input device 512, and UI navigation device 514 may be a touch screen display. The machine 500 may additionally include a mass storage (e.g., drive unit) 516, a signal generation device 518 (e.g., a speaker), a network interface device 520, and one or more sensors 521, such as a global positioning system (GPS) sensor, camera, video recorder, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The mass storage 516 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage 516 may constitute machine readable media.

While the machine-readable medium 522 is illustrated as a single medium, the term "machine readable medium" may include a single medium or multiple media (e.g., a centralized or distributed database, and/or associated caches and servers) that configured to store the one or more instructions 524. The term "machine-readable medium" may include any tangible medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

VARIOUS NOTES & EXAMPLES

The following examples pertain to further embodiments. Specifics in the examples may be used anywhere in one or more embodiments.

Example 1 can include subject matter (such as an apparatus, a method, a means for performing acts, or a machine readable medium including instructions that, when performed by the machine, that can cause the machine to perform acts), to: obtain a set of context data from the computing device; maintain a credential that corresponds to a secured resource; receive a request for access to the secured resource via an interface of the computing device; generate a unique challenge question based on a contextual data item in the set of context data; present the unique challenge question via the interface; receive an input in response to the challenge question via the interface; evaluate the input in view of the contextual data item; and provide the credential to the secured resource in response to a positive evaluation of the input.

Example 2 can include, or can optionally be combined with the subject matter of Example 1, to optionally further comprise instructions to maintain a timer for a period, during which the response to the challenge question can be received.

Example 3 can include, or can optionally be combined with the subject matter of any one or more of Examples 1 or 2, to optionally include a plurality of instructions that in response to being executed on the computing device, can cause the computing device to: request a username and password combination that corresponds to the secured resource in response to a negative evaluation of the input.

Example 4 can include, or can optionally be combined with the subject matter of any one or more of Examples 1, 2 or 3, to optionally include a plurality of instructions that in response to being executed on a computing device, can cause the computing device to: monitor user activities via the computing device; generate a plurality of contextual data items in response to the monitoring; and populate the set of context data with the plurality of contextual data items.

Example 5 can include, or can optionally be combined with the subject matter of Example 4, wherein monitoring user activities via the computing device includes accessing at least one of: a calendar database, e-mail communications, one or more text messages, data indicating a geographic location of the device, audio signals from a microphone, web browsing history, social network interactions, or a list of user contacts.

Example 6 can include, or can optionally be combined with the subject matter of any one or more of Examples 1 through 5, wherein the secured resource includes at least one of: a bank website, a financial institution portal, an educational institution, a government service, a social network, an e-mail service, a media outlet, a gaming environment, a virtual reality system, or a massive role-playing game.

Example 7 can include, or can optionally be combined with the subject matter of any one or more of Examples 1 through 6, to optionally include wherein the credential that corresponds to a secured resource includes a username and password combination that is maintained in an encrypted proxy vault.

Example 8 can include, or can optionally be combined with the subject matter of any one or more of Examples 1 through 7, to optionally cause the computing device to: determine a value of the secure resource, wherein the challenge question is generated, at least in part, upon the value of the secure resource; generate a second unique challenge question, in response to the value being greater than a threshold level, based on a second contextual data item in the set of context data; receive a second response to the second challenge question; and evaluate the second response for correctness; wherein the credential is provided to the secured resource, at least in part, in response to the second response being correct.

Example 9 can include subject matter (such as an apparatus, a method, a means for performing acts, or a machine readable medium including instructions that, when performed by the machine, that can cause the machine to perform acts), such as a method of contextual authentication comprising: monitoring one or more activities performed with a computing device; transmitting contextual data derived from the one or more activities to a proxy coupled to the computing device by a network; storing a set of user credentials in an encrypted vault; generating a challenge question based on the contextual data in response to a request for access to a username-password combination in the set of user credentials; evaluating a response to the challenge question in order to grant or deny access to the encrypted vault; and transmitting one of the set of user credentials that corresponds to the secure resource to the secure resource over the network when the response to the challenge question is correct.

Example 10 can include, or can optionally be combined with the subject matter of Example 9, to optionally include wherein the proxy includes an encrypted vault configured to maintain the set of user credentials.

Example 11 can include, or can optionally be combined with the subject matter of any one or more of Examples 9 or 10, to optionally include wherein the secure resource is a website that provides access in response to a username-password combination included in the set of user credentials.

Example 12 can include, or can optionally be combined with the subject matter of any one or more of Examples 9 through 11 to optionally include: determining to a cognitive status of a user based a user-response to one or more questions; wherein generating the challenge question based on the contextual data includes adapting a difficulty level of the challenge questions to the cognitive status of the user.

Example 13 can include, or can optionally be combined with the subject matter of any one or more of Examples 9 through 12, to optionally include generating a plurality of incorrect answers to the challenge question; and displaying the challenge question, the plurality of incorrect answers to the challenge question, and a correct answer to the challenge question on a display of the computing device.

Example 14 can include, or can optionally be combined with the subject matter of any one or more of Examples 9 through 13, to optionally include determining a security value of the secure resource; generating one or more additional challenge questions, in response to the security value being greater than a set security level, based on a second contextual data item in the set of context data; and receive an additional input in response to the second challenge question; wherein the positive evaluation includes a positive evaluation of the additional input.

Example 15 can include subject matter (such as an apparatus, a method, a means for performing acts, or a machine readable medium including instructions that, when performed by the machine, that can cause the machine to perform acts), such as a contextual authentication system comprising: a user-interface of a device coupled to a proxy engine, the proxy engine being configured to monitor the user-interface and store user-context data in a contextual database; a secure password vault configured to maintain a set of user credentials, the secure password vault being coupled to the proxy engine; and a proxy interface coupled to the proxy engine, the proxy interface being configured to intercept a request for a secure resource received by the user-interface; wherein, in response to the request, the proxy engine is configured to generate a contextual challenge based on the user-context data in the contextual database, the contextual challenge being presented via the proxy interface, and access to the secure resource being prevented by the proxy engine until a correct answer to the contextual challenge is received.

Example 16 can include, or can optionally be combined with the subject matter of Example 15, to optionally include: a password proxy service, coupled to the device via a network, the password proxy service being configured to maintain the secure password vault; wherein, in response to the proxy engine indicating that the correct answer to the contextual challenge was received, the password proxy service transmits a credential, from the set of user credentials that corresponds to the secure resource, to the secure resource.

Example 17 can include or can optionally be combined with the subject matter of any one or more of Examples 15 or 16, to optionally include wherein the secure password vault is configured to maintain a record of a plurality of credentials for a plurality of users.

Example 18 can include, or can optionally be combined with the subject matter of any one or more of Examples 15 through 17, to optionally include wherein the secure resource is a third-party server coupled to the network.

Example 19 can include, or can optionally be combined with the subject matter of any one or more of Examples 15 through 18, to optionally include wherein the third-party server includes at least one of: a bank, a financial institution, an educational institution, a government service, a social network, an e-mail service, a media outlet, a gaming environment, a virtual reality, or a massive role-playing game.

Example 20 can include, or can optionally be combined with the subject matter of any one or more of Examples 15 through 19, to optionally include wherein the correct answer to the contextual challenge eliminates the need for a user to memorize or input a username or a password.

Example 21 can include, or can optionally be combined with the subject matter of any one or more of Examples 1 through 8, to optionally cause the computing device to: generate questions based on one or more social networking interactions on a social network accessible from the computing device, or access personal data on the computing device.

Example 22 can include, or can optionally be combined with the subject matter of any one or more of Examples 9 through 14, to optionally include wherein a format of the challenge question changes in response to a time of day or the monitored one or more activities performed with the computing device, and the contextual data used in generating the challenge question is specific to a single user.

Example 23 can include subject matter (such as an apparatus, a method, a means for performing acts, or a machine readable medium including instructions that, when performed by the machine, that can cause the machine to perform acts), such as an apparatus for authenticating a user, configured to perform the method of any one of the examples 9 to 14 or 22.

Example 24 can include subject matter (such as an apparatus, a method, a means for performing acts, or a machine readable medium including instructions that, when performed by the machine, that can cause the machine to perform acts), such as a machine readable medium comprising a plurality of instructions that in response to being executed on a computing device, cause the computing device to carry out a method according to any one of examples 9 through 14 or 22.

Each of these non-limiting examples can stand on its own, or can be combined in any permutation or combination with any one or more of the other examples.

What is claimed is:

1. At least one non-transitory machine readable storage medium comprising a plurality of instructions that in response to being executed on a computing device cause the computing device to:
   obtain user specific context data from one or more sensors of the computing device and by monitoring one or more user activities performed with a user interface of a computing device;
   maintain a credential in an encrypted proxy vault on the computing device that corresponds to a secured resource;
   receive a request for access to the secured resource via an interface of the computing device;
   determining a security value of the secure resource associated with the credential;
   generate a challenge question based on a contextual data item in the user specific context data;
   present the challenge question via the interface of the computing device;
   receive a response to the challenge question via the interface of the computing device;
   evaluate the response for correctness;
   generate one or more additional challenge questions, in response to the security value being greater than a set security level, the one or more additional challenge questions based on a second user specific contextual data item; and
   provide the credential to the secured resource in response to the response being correct.

2. The at least one non-transitory machine readable medium as recited in claim 1, further comprising instructions to maintain a timer for a period, during which the response to the challenge question can be received.

3. The at least one non-transitory machine readable medium as recited in claim 1, comprising a plurality of instructions that in response to being executed on a computing device can cause the computing device to:
   request a username and password combination that corresponds to the secured resource in response to a negative evaluation of the response.

4. The at least one non-transitory machine readable medium as recited in claim 1, comprising a plurality of instructions that in response to being executed on a computing device can cause the computing device to:
   generate a plurality of contextual data items in response to the monitoring; and populate the user specific context data with the plurality of contextual data items.

5. The at least one non-transitory machine readable medium as recited in claim 4, wherein the instructions to monitor user activities via the computing device includes instructions to access at least one of: a calendar database, an e-mail communication, a text message, data indicating a geographic location of the computing device, audio signals from a microphone, web browsing history, social network interactions, or a list of user contacts.

6. The at least one non-transitory machine readable medium as recited in claim 1, wherein the secured resource includes at least one of: a bank website, a financial institution portal, an educational institution, a government service, a social network, an e-mail service, a media outlet, a gaming environment, a virtual reality system, or a massive role-playing game.

7. The at least one non-transitory machine readable medium as recited in claim 1, wherein the credential that corresponds to the secured resource includes a username and password combination that is maintained in the encrypted proxy vault.

8. The at least one non-transitory machine readable medium as recited in claim 1, comprising a plurality of instructions that in response to being executed on a computing device, can cause the computing device to:
receive a second response to the second challenge question; and
evaluate the second response for correctness;
wherein the credential is provided to the secured resource, at least in part, in response to the second response being correct.

9. The at least one non-transitory machine readable medium as recited in claim 1, comprising a plurality of instructions that in response to being executed on a computing device can cause the computing device to: generate questions based on one or more social networking interactions on a social network accessible from the computing device, or access personal data on the computing device.

10. A method of contextual authentication comprising:
monitoring one or more user activities performed with a user interface of a computing device;
obtaining user specific data from one or more sensors of the computing device;
transmitting user specific contextual data derived from the one or more user activities and the user specific data to a proxy device coupled to the computing device by a network;
storing a set of user credentials in an encrypted vault;
determining a security value of a secure resource associated with a credential in the set of user credentials;
generating, in response to a request for access to a username-password combination in the set of user credentials, a challenge question based on the user specific contextual data;
evaluating a response to the challenge question to determine whether the response is correct;
generating one or more additional challenge questions, in response to the security value being greater than a set security level, the one or more additional challenge questions based on a second user specific contextual data item; and
transmitting one of the set of user credentials that corresponds to the secure resource to the secure resource over the network when the response to the challenge question is correct.

11. The method of claim 10, wherein the computing device includes the encrypted vault configured to store the set of user credentials.

12. The method of claim 11, wherein the secure resource is a website that provides access in response to a username-password combination included in the set of user credentials.

13. The method of claim 10, further comprising:
determining to a cognitive status of a user based a user-response to one or more questions;
wherein generating the challenge question based on the user specific contextual data includes adapting a difficulty level of the challenge questions to the cognitive status of the user.

14. The method of claim 10, further comprising:
generating a plurality of incorrect answers to the challenge question; and
displaying the challenge question, the plurality of incorrect answers to the challenge question, and a correct answer to the challenge question on a display of the computing device.

15. The method of claim 14, further comprising:
receiving an additional input in response to the one or more additional challenge questions;
wherein the positive evaluation includes a positive evaluation of the additional input.

16. The method of claim 10, wherein a format of the challenge question changes in response to a time of day or the monitored one or more activities performed with the computing device, and the user specific contextual data used in generating the challenge question is specific to a single user.

17. A contextual authentication system comprising:
a device including one or more sensors, the one or more sensors configured to obtain user-context data based on user activity with the device;
a user-interface of the device coupled to a proxy engine, the proxy engine being configured to monitor the user-interface and the one or more sensors, and to store the user-context data in a contextual database;
a secure password vault configured to maintain a set of user credentials, the secure password vault including a memory and being coupled to the proxy engine; and
a proxy interface coupled to the proxy engine, the proxy interface being configured to intercept a request for a secure resource received by the user-interface;
wherein, in response to the request, the proxy engine is configured to: determine a security value of the secure resource, generate a contextual challenge based on the user-context data in the contextual database, the contextual challenge being presented via the proxy interface, generate one or more additional challenge questions, in response to the security value being greater than a set security level, the one or more additional challenge questions based on a second user specific contextual data item, and access to the secure resource being prevented by the proxy engine until a correct answer to the contextual challenge is received.

18. The contextual authentication system of claim 17, further comprising:
a password proxy service, coupled to the device via a network, the password proxy service being configured to maintain the secure password vault;
wherein in response to the proxy engine indicating that the correct answer to the contextual challenge was received, the password proxy service transmits a credential, from the set of user credentials that corresponds to the secure resource, to the secure resource.

19. The contextual authentication system of claim 17, wherein the secure password vault is configured to maintain a record of a plurality of credentials for a plurality of users.

20. The contextual authentication system of claim 17, wherein the secure resource includes at least one of: a bank website, financial institution portal, an educational institution, a government service, asocial network, an e-mail service, a media outlet, a gaming environment, a virtual reality system, or a massive role-playing game.

21. The contextual authentication system of claim 20, wherein the secure resource includes a server configured to receive the credential.

22. The contextual authentication system of claim 17, wherein the correct answer to the contextual challenge eliminates the need for a user to memorize or input a username or a password.

* * * * *